US008077090B1

United States Patent
Chintalapudi et al.

(10) Patent No.: US 8,077,090 B1
(45) Date of Patent: Dec. 13, 2011

(54) SIMULTANEOUS LOCALIZATION AND RF MODELING

(75) Inventors: Krishna Kant Chintalapudi, Bangalore (IN); Venkata N. Padmanabhan, Bangalore (IN); Anand Padmanabha Iyer, Trivandrum (IN)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 12/815,973

(22) Filed: Jun. 15, 2010

(51) Int. Cl.
*G01S 3/02* (2006.01)
(52) U.S. Cl. .................................. 342/451; 342/450
(58) Field of Classification Search .............. 342/451, 342/450
See application file for complete search history.

(56) References Cited

U.S. PATENT DOCUMENTS

| | | | |
|---|---|---|---|
| 6,046,698 A | 4/2000 | Pandey | |
| 6,246,861 B1* | 6/2001 | Messier et al. | 455/12.1 |
| 6,674,403 B2* | 1/2004 | Gray et al. | 342/463 |
| 7,312,752 B2* | 12/2007 | Smith et al. | 342/464 |
| 7,433,696 B2* | 10/2008 | Dietrich et al. | 455/456.2 |
| 7,590,720 B2 | 9/2009 | Bahl | |
| 7,769,396 B2* | 8/2010 | Alizadeh-Shabdiz et al. | 455/456.6 |
| 2001/0022558 A1* | 9/2001 | Karr et al. | 342/450 |
| 2005/0136845 A1* | 6/2005 | Masuoka et al. | 455/67.14 |
| 2006/0239202 A1* | 10/2006 | Kyperountas et al. | 370/252 |
| 2007/0139269 A1* | 6/2007 | Chen et al. | 342/450 |
| 2008/0198948 A1* | 8/2008 | Tang | 375/316 |
| 2009/0247186 A1* | 10/2009 | Ji et al. | 455/456.1 |
| 2010/0073235 A1 | 3/2010 | Smith et al. | |

OTHER PUBLICATIONS

Barsocchi, et al., "A Novel Approach to Indoor RSSI Localization by Automatic Calibration of the Wireless Propagation Model", Retrieved at << http://wnlab.isti.cnr.it/paolo/papers/VTC09-localization.pdf>>, IEEE 69th Vehicular Technology Conference, Apr. 26-29, 2009, pp. 5.
Barsocchi, et al.,"Virtual Calibration for RSSI-based Indoor Localization with IEEE 802.15.4", << http://ieeexplore.ieee.org/stamp/stamp.jsp?tp=&amumber=5199566 >>, IEEE International Conference on Communications, 2009, Jun. 14-18, 2009, pp. 5.
De Faria, Daniel Braga, "Scalable Location-Based Security in Wireless Networks", Retrieved at << http://www-cs-students.standard.edu/~dbfaria/files/faria-dissertation.pdf >>, Stanford University, Dec. 2006, pp. 183.

(Continued)

*Primary Examiner* — Thomas Tarcza
*Assistant Examiner* — Frank McGue
(74) *Attorney, Agent, or Firm* — Lyon & Harr, LLP; Katrina A. Lyon

(57) ABSTRACT

The simultaneous localization and RF modeling technique pertains to a method of providing simultaneous localization and radio frequency (RF) modeling. In one embodiment, the technique operates in a space with wireless local area network coverage (or other RF transmitters). Users carrying Wi-Fi-enabled devices traverse this space while the mobile devices record the Received Signal Strength (RSS) measurements corresponding to access points (APs) in view at various unknown locations and report these RSS measurements, as well as nay other available location fix to a localization server. A RF modeling algorithm runs on the server and is used to estimate the location of the APs using the recorded RSSI measurements and any other available location information. All of the observations are constrained by the physics of wireless propagation. The technique models these constraints and uses a genetic algorithm to solve them, thereby providing an absolute location of the mobile device.

20 Claims, 6 Drawing Sheets

OTHER PUBLICATIONS

Bahl, et al., "DAIR: A Framework for Managing Enterprise Wireless Networks Using Desktop Infrastructure", Retrieved at << http://research.microsoft.com/en-us/um/people/padhye/publications/hotnets-2005.pdf >>, In Proceedings of the Annual ACM Workshop on Hot Topics in Networks (HotNets), Nov. 15, 2005, pp. 1-6.

Bahl, et al.,"RADAR:An Inbuilding RF-Based User Location and Tracking System", Retrieved at << http://www-robotics.usc.edu/~gaurav/CS599-IES/StudentPres/19.ppt >>, INFOCOM 2000. Nineteenth Annual Joint Conference of the IEEE Computer and Communications Societies. Proceedings. IEEE, vol. 2, Mar. 26-30, 2000, pp. 24.

Want, et al., "The Active Badge Location System", Retrieved at << http://web.media.mit.edu/~dmerrill/badge/Want92__ActiveBadge.pdf >>, ACM Transactions on Information Systems (TOIS), vol. 10, No. 1, Jan. 1992, pp. 10.

Guha, et al., "Sextant: A Unified Node and Event Localization Framework Using Non-Convex Constraints", Retrieved at << http://www.cs.cornell.edu/People/egs/papers/sextant.pdf>>, Proceedings of the 6th ACM international symposium on Mobile ad hoc networking and computing, May 25-27, 2005, pp. 12.

Haeberlen, et al., "Practical Robust Localization Over Large-Scale 802.11 Wireless Networks", Retrieved at << http://citeseerx.ist.psu.edu/viewdoc/download?doi=10.1.80.6957&rep=rep1&type=pdf >>, Proceedings of the 10th annual international conference on Mobile computing and networking, Sep. 26-Oct. 1, 2004, pp. 15.

Ji, et al., "Ariadne: A Dynamic Indoor Signal Map Construction and Localization System", Retrieved at << http://www.usenix.org/events/mobisys06/full_papers/p151-ji.pdf>>, Proceedings of the 4th international conference on Mobile systems, applications and services, Jun. 19-22, 2006, pp. 151-164.

Bulusu, et al., "GPS-Less Low Cost Outdoor Localization for Very Small Devices", Retrieved at << http://www.isi.edu/~johnh/PAPERS/Bulusu00.a.pdf >>, IEEE Personal Communications Magazine, vol. 7, No. 5, Oct. 2000, pp. 1-7.

Kirkpatrick, et al., "Optimization by Simulated Annealing", Retrieved at << http://www.fisica.uniud.it/~ercolessi/MC/kgv1983.pdf>>, Science, vol. 220. No. 4598, May 13, 1983, pp. 10.

Krumm, et al., "The NearMe Wireless Proximity Server", Retrieved at << http://research.microsoft.com/en-us/um/people/kenh/papers/nearme.pdf>>, In Proceedings of Ubicomp: Ubiquitous Computing, Sep. 25-27, 2000, pp. 283-300.

La Marca, et al., "Place Lab: Device Positioning Using Radio Beacons in the Wild", Retrieved at << http://www.placelab.org/publications/pubs/pervasive-placelab-2005-final.pdf>>, In Proceedings of the Third International Conference on Pervasive Computing, May 8-13, 2005, pp. 18.

Peng, et al., "Demo Abstract: A Beepbeep Ranging System on Mobile Phones", Retrieved at << http://research.microsoft.com/pubs/77330/demo_sensys07_beepbeep.pdf >> , Sensys'07 Best Demo Award, Nov. 2007, pp. 2.

Priyantha, et al., "The Cricket Location-Support System", Retrieved at << http://graphics.stanford.edu/courses/cs428-03-spring/Papers/readings/Location/Balakrishnan_cricket_mobicom00.pdf >>, 6th ACM International Conference on Mobile Computing and Networking (ACM MOBICOM), Aug. 6-11, 2000, pp. 12.

Suli, et al., "An Introduction to Numerical Analysis", Retrieved at << http://assets.cambridge.org/97805218/10265/frontmatter/9780521810265_frontmatter.pdf >>, University Press, Cambridge, 2003, pp. 10.

Azizyan, et al., "SurroundSense: Mobile Phone Localization via Ambience Fingerprinting", Retrieved at << http://synrg.ee.duke.edu/papers/surroundsense.pdf>>, In MobiCom, Sep. 20-25, 2009, pp. 12.

Bahl, et al., "DAIR: A Framework for Managing Enterprise Wireless Networks Using Desktop Infrastructure", Retrieved at << http://citeseerx.ist.psu.edu/viewdoc/downloaded?doi=10.1.1.70.6494&rep=rep1&type=pdf>>, In HotNets, Nov. 15, 2005, pp. 1-6.

Bahl, et al., "RADAR: An In-Building RF-based User Location and Tracking System", Retrieved at << http://citeseerx.ist.psu.edu/viewdoc/download?doi=10.1.1.21.8890&rep=rep1&type=pdf >>, In INFOCOM, Mar. 29, 2000, pp. 10.

Capkun, et al., "GPS-free Positioning in Mobile Ad-Hoc Networks", Retrieved at << http://pi4.informatik.uni-mannheim.de/~haensel/sensometze/Capkun.pdf>>, in HICSS, Jan. 3-6, 2001, pp. 1-15.

Ekahau. Retrieved at << http://www.ekahau.com/ >>, pp. 1.

Ferris, et al, "WiFi-SLAM Using Gaussian Process Latent Variable Models", Retrieved at << http://www.cs.washington.edu/ai/Mobile_Robotics/postscripts/gplvm-wifi-slam-ijcai-07.pdf>>, In JCAI, Jan. 6-12, 2007, pp. 6.

Guha, et al., "Sextant: A Unified Node and Event Localization Framework Using Non-Convex Constraints", Retrieved at << http://www.cs.cornell.edu/People/egs/papers/sextant.pdf>>, In MobiHoc, May 25-28, 2005, pp. 12.

Gwon, et al., "Error Characteristics and Calibration-Free Techniques for Wireless LAN-Based Location Estimation", Retrieved at << http://www.gurulib.com/_user_manual_file/pic_1209049296984.pdf>>, in Mobiwac, Oct. 1, 2004, pp. 2-9.

Haeberlen, et al., "Practical Robust Localization over Large-Scale 802.11 Wireless Networks", Retrieved at << http://www.google.co.in/url?sa=t&source=web&cd=1&ved=0CBoQFjAA8url=http%3A%2F%2Fciteseerx.ist.psu.edu%2Fviewdoc%2Fdownload%3Fdoi%3D10.1.1.80.6957%26rep%3Drep1%3Drep1%26type%3Dpdf&rct=j&q=Practical+robust+localization+over+large-scale+802.11+wireless+networks&ei=JSsbTPioFtX64Abm_6CiCg&usg=AFQjCNEDIhiO0iduVGMHeSbScxSsE0cuwQ >>, in MobiCom.

Lim, et al., "Zero Configuration Robust Indoor Localization : Theory and Experimentation", Retrieved at << http://swing.cs.uiuc.edu/papers/INFOCOM06LOC.pdf>>, in Infocom, Apr. 23-29, 2006, pp. 12.

Ji, et al., "Ariadne: A Dynamic Indoor Signal Map Construction and Localization System", Retrieved at << http://www.usenix.org/events/mobisys06/full_papers/p151-ji.pdf>>, In MobiSys, Jun. 21, 2006, pp. 151-164.

Bulushu, et al., "GPS-Less Low Cost Outdoor Localization for Very Small Devices", Retrieved at << http://www.isi.edu/~johnh/PAPERS/Bulusu00a.pdf>>, IEEE Personal Communications Magazine 7, 2000, pp. 1-7.

Kirkpatrick, et al., "Optimization by Simulated Annealing", Retrieved at << http://www.fisica.uniud.it/~ercolessi/MC/kgv1983.pdf>>, Science, New Series 220, 1983, pp. 671-680.

Leonard, et al., "Simulatanoues Map Building and Localization for an Autonomous Mobile Robot", Retrieved at << http://cml.mit.edu/~jleonard/pubs/Idw_iros_1991.pdf>>, In IROS,1991, pp. 1442-1447.

Ni, et al., "LANDMARC: Indoor Location Sensing Using Active RFID", Retrieved at << http://www.angoya.net/Ini/papers/MyPapers/NLLP03.pdf >>, In WINET, 2004, pp. 9.

Niculescu, et al., "Ad-Hoc Position System", Retrieved at << http://www.cesca.centers.vt.edu/research/references/uwb/sensor_static_location/adhoc_positioning.pdf>>, In IEEE Globecom, Dec. 2001, pp. 2926-2931.

Niculescu, et al., "Ad-Hoc Positioning System (APS) Using AOA", Retrieved at << http://www.google.co.in/url?sa=t&source=web&cd=2&ved=0CB4QFjAB&url=http%3A%2F%2Fciteseerx.ist.psu.edu%2Fviewdoc%2Fdownload%3Fdoi%3D10.1.1.13.2982%26rep%3Drep1%26type%3Dpdf&rct=j&q=Ad-hoc+position+system&ei=jxwbTP64J4nw0gTjw-mVCQ&usg=AFQjCNHT5F1HzUFRmWsKzU7sk1cgkwX6Bg >>, In Infocom, Apr. 1-3, 2003, pp. 10.

Priyantha, et al., "The Cricket Location-Support System", Retrieved at << http://graphics.stanford.edu/courses/cs428-03-spring/Papers/readings/Location/Balakrishnan_cricket_mobicom00.pdf >>, in MobiCom, Aug. 6-11, 2000, pp. 12.

Savvides, et al., "Dynamic Fine-Grained Localization in Ad-Hoc Networks of Sensors", Retrieved at << http://citeseerx.ist.psu.edu/viewdoc/download?doi=10.1.1.95.3217&rep=rep1&type=pdf >>, In MobiCom, Jul. 16-21, 2001, pp. 1-14.

Varshavsky, et al., "GSM Indoor Localization", Retrieved at << http://citeseerx.ist.psu.edu/viewdoc/download?doi=10.1.1.128.7286&rep=rep1&type=pdf >>, Pervasive and Mobile Computing Journal, Elsevier, vol. 3, No. 6, 2007, pp. 24.

Want, et al., "The Active Badge Location System", Retrieved at << http://www.google.co.in/url?sa=t&source=web&cd=1&ved=0CBUQFjAA&url=http%3A%2F%2Fciteseerx.ist.psu.edu%2Fviewdoc%2Fdownload%3Fd oi%3D10.1.1.36.123%26rep%3Drep1%26type%3Dpdf&rct=j&q=The+active+badge+location+system&ei=wB8bTOWFDJPy0gTz7qiFCQ&usg=AFQICNGPwXu3weAhodZc6pPv_yNwMqGG1A >>, ACM Transactions on Information Systems, Jan. 1992, pp. 10.

Ward, et al., "A New Location Technique for the Active Office", Retrieved at << http://www.google.co.in/url?sa=t&source=web&cd=1&ved=0CBgQFjAA&url=http%3A%2F%2Fciteseerx.ist.psu.edu%2Fviewdoc%2Fdownload%3Fdoi%3D10.1.1.93.1624%26rep%3Drep1%26type%3Dpdf&rct=j&q=A+new+location+technique+for+the+active+office.&ei=DSAbTNvoKYj80wSk8MSBCQ&usg=AFQjCNFXPxCyFdkpD1lgp6J8xfjM_4eO6w >>, IEEE Per. Comm. 4 (5), Oct. 1997, pp. 11.

Yang, et al., "Beyond Trilateration: On the Localizability of Wireless Ad-Hoc Networks", Retrieved at << http://www.di.unito.it/~matteo/I09/DATA09/01-69-01.PDF >>, In InfoCom, Apr. 19-25, 2009, pp. 9.

Youssef, et al., "The Horus WLAN Location Determination System", Retrieved at << http://www.cs.umd.edu/~moustafa/papers/horus_usenix.pdf >>, in MobiSys, Jun. 6-8, 2005, pp. 14.

* cited by examiner

SCENARIO 1-A

SCENARIO 1-B

SCENARIO II

SIMULTANEOUS LOCALIZATION AND RF MODELING

BACKGROUND

The need for location information to enable pervasive computing applications in indoor environments, coupled with the unavailability of GPS in such environments, has motivated a large body of research on indoor localization. In particular, there has been a focus on leveraging existing infrastructure, such as, for example, access points in a wireless local area networks, to enable indoor localization. The advantage of this approach is that the cost of deploying a specialized infrastructure for localization is avoided. While the near-ubiquity of wireless Local Area Networks (WLAN), also commonly named WiFi-networks, makes WLAN-based indoor localization attractive, there is a need for a significant degree of pre-deployment efforts such as, for example, building detailed Radio Frequency (RF) maps or RF propagation models based on surveys of the environment, with these approaches.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The simultaneous localization and RF modeling technique described herein pertains to a method of providing simultaneous localization and radio frequency (RF) modeling.

In one embodiment of the simultaneous localization and RF modeling technique, the technique operates in an indoor space, such as an office building or a mall, with wide area WLAN coverage (or other RF transmitters) but where there is no knowledge of the physical layout, including the placement of wireless Access Point (APs) (or other RF transmitters). Users carrying Wi-Fi-enabled mobile computing devices, such as smartphones, traverse the space in normal course. The mobile devices record the Received Signal Strength (RSS) measurements corresponding to the APs in view at various (unknown) locations and report these to a localization server. Occasionally, a mobile device will also obtain and report a location fix, say by obtaining a Global Positioning System (GPS) lock at the entrance of the space or near a window. A simultaneous localization and RF modeling algorithm runs on the localization server and is used to estimate the location of the Wi-Fi APs using the recorded RSSI measurements and any other available location information. All of the observations reported to the server, even the many from unknown locations, are constrained by the physics of wireless RF propagation. The simultaneous localization and RF model models these constraints and then uses a genetic algorithm to solve them, thereby providing an absolute location of the mobile device (e.g., in terms of latitude and longitude).

It should be noted that the technique is not limited to only indoor environments and can be used anywhere there are RF transmitters. Additionally, any RF transmitter device can be used instead of only Wi-Fi access points, such as, for example, global system for mobile communications (GSM) transmitters. Also, although no knowledge of the physical layout of the space being mapped is necessary, if layout information is available it can be used to improve simultaneous localization and RF modeling using the technique.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
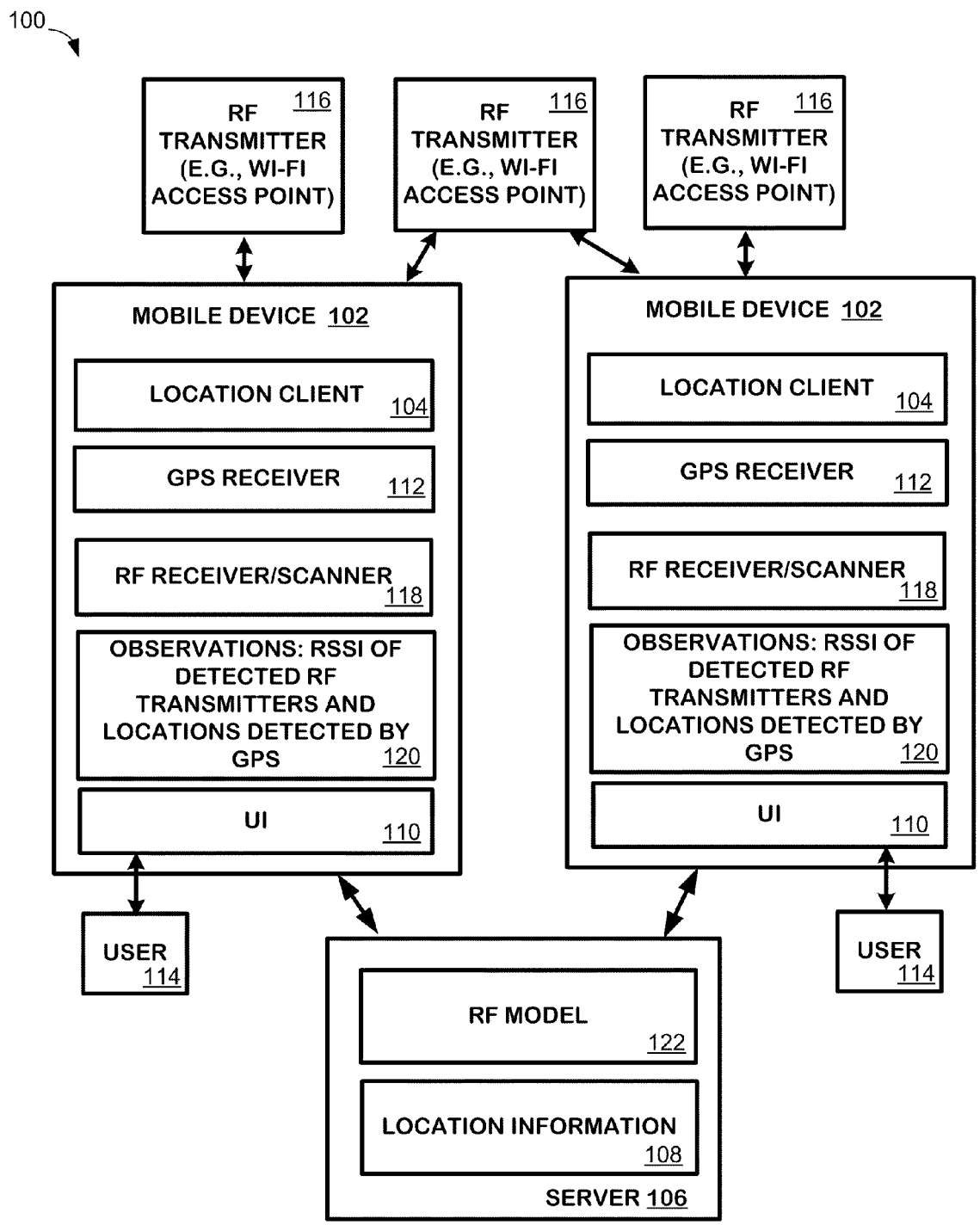
FIG. 1 is an exemplary architecture for employing one exemplary embodiment of the simultaneous localization and RF modeling technique described herein.

In the following description of the simultaneous localization and RF modeling technique, reference is made to the accompanying drawings, which form a part thereof, and which show by way of illustration examples by which the simultaneous localization and RF modeling technique described herein may be practiced. It is to be understood that other embodiments may be utilized and structural changes may be made without departing from the scope of the claimed subject matter.

1.0 Simultaneous Localization and RF Modeling Technique

The following sections provide an overview of the simultaneous localization and RF modeling technique, as well as exemplary architectures and processes for employing the technique. Exemplary computations for creating and using the RF model employed in one embodiment of the technique for localization are also described.

1.1 Overview of the Technique

There has been a focus on leveraging existing infrastructure (e.g., wireless access points) to enable indoor localization, the advantage being that the cost of deploying a specialized infrastructure for localization is avoided. Existing solutions, however, require extensive pre-deployment effort, for instance, to build detailed RF maps or RF propagation models based on surveys of the environment. The simultaneous localization and RF modeling technique described herein provides a novel localization system that leverages existing infrastructure but does not require any explicit pre-deployment effort. Although much of this specification describes simultaneous localization and RF modeling by employing a wireless local area network (WLAN), commonly called a Wi-Fi network, and associated wireless access points in an indoor environment, it is to be understood that the technique's embodiments can be employed with any system of RF transmitters in both indoor and outdoor environments.

In one embodiment, in an indoor environment, the simultaneous localization and RF modeling technique relies on three basic assumptions: (i) that there are enough wireless APs to provide excellent coverage throughout the indoor environment, (ii) that users carry mobile devices, such as smartphones and netbooks, equipped with Wi-Fi receivers, and (iii) that occasionally a mobile device obtains an absolute location fix, say by obtaining a GPS lock at the edges of the indoor environment, such as at the entrance or near a window. In one embodiment of the simultaneous localization and RF modeling technique, users simply sit, stand, or move around in the indoor environment in normal course. While they do so, each user's mobile device records the received signal strength (RSS) from the wireless APs visible to it at various (unknown) locations, and reports this information, along with the occasional location fix when available, to a central localization server. The server uses this data to simultaneously learn the characteristics of the RF propagation environment to build an RF model and to localize the users' devices. Localization is performed in terms of absolute coordinates: latitude and longitude.

A key advantage of embodiments of the simultaneous localization and RF modeling technique is that they do not require any prior knowledge of the RF environment, including the location and transmit power of the APs, information that is often not readily available in settings such as malls and multi-tenant office buildings, where APs have been deployed by many different entities reducing the calibration effort needed for indoor localization. Another advantage is that embodiments of the simultaneous localization and RF modeling technique described herein do not require any explicit user participation to aid the localization process. In particular, users are not required to indicate their current locations, even when building the RF model used in localization. Finally, the simultaneous localization and RF modeling technique only needs measurements of the APs by the mobile node and does not require any distance measurements between mobile nodes. So even a single mobile node that traverses the space of interest over time can generate sufficient data for the simultaneous localization and RF modeling.

By not requiring any pre-deployment effort or explicit user participation, the simultaneous localization and RF modeling technique has the potential of enabling practical and viable localization. For instance, a simultaneous localization and RF modeling server in a cloud could automatically construct an RF model for, and thereby enable localization in, an indoor space in any part of the world, based just on the measurements reported by the simultaneous localization and RF modeling technique's clients in the space of interest. Such automated operation brings forth a number of novel challenges, including filtering the very large number of measurement reports to identify a small and useful subset, and efficiently computing the RF model despite the very large space of possibilities.

1.2 Exemplary Architecture.

As shown in FIG. 1, one embodiment of the simultaneous localization and RF modeling technique employs a client-server architecture 100. Mobile computing devices (laptops, cell phones, netbooks, and so on) 102 act as clients and connect to a simultaneous localization and RF modeling server 106. Both the mobile computing devices 102 and the server 106 can be implemented in a general purpose computing environment which will be discussed in greater detail with respect to FIG. 6. The server 106 is responsible for providing location information 108 to the one or more mobile devices 102. In one embodiment of the technique, the system can support multiple mobile devices 102 to communicate with the server 106 and obtain location information. One embodiment of the technique provides a User Interface (UI) 110 on the mobile device 102 to let the user 114 send location queries.

The UI 110 displays the current location of the user 114 on a floor map in response to the query. In one working embodiment of the technique, all communication between the mobile device 102 and the server 104 has been implemented over TCP sockets. This implementation uses a Wi-Fi interface to communicate, however, a cellular interface could be used as well.

In one embodiment, a location client 104 is a piece of software that is installed on the mobile devices 102. The location client 104 has two important tasks. First, it provides location information to mobile applications residing on the mobile device 102, and second, it assists the server 106 in the construction of an RSS map of the local environment.

In one embodiment of the technique, the location client 104 first checks to see it can obtain its location using a GPS receiver 112. If no GPS signal is available, it scans its environment for wireless APs 116 in its view using a RF scanner 118. The scanner 118 scans for a few seconds (3 seconds in one implementation) collecting beacons from each AP 116 it sees. It then transmits its observations 120, in one embodiment a list of the mean and standard deviation of the RSS seen from various APs 116 over the collected data to the server 106. Using the mean reduces errors due to multi-path while the standard deviation is used to determine the quality of the data. The server 106 then uses a computed RF model 122 of the RSS environment to determine the location of the mobile device in real time and responds to the location client 104.

For new indoor spaces, the RF model 122 must first be generated before location queries can be answered. For this, the client or clients 104 scan for wireless APs 116 in their range and transmit the observed mean and standard deviation of RSS to the server 106 in the same manner as a location query. While in one implementation the mobile devices 102 periodically perform a scan and push the information to the server 106, this can be easily implemented as a pull, where the server 106 requests a scan. Pull is desirable since mobile devices then need scan only when necessary and this can lead to significant energy savings.

The server 106 has two important functions. First, it responds to location queries from the location clients 104 in real time, and second, it uses a simultaneous localization and RF modeling algorithm to construct and maintain the RF model 122 for the environment in question.

The data from a large number of mobile devices can be very large and in many cases is not useful for creating the RF model 122. Thus, in one embodiment, the simultaneous localization and RF modeling technique performs pre-filtering and selects only a useful subset of the available data to construct the model. Additionally, the server 106, may potentially reside in a cloud and leverage its computing resource to construct the RF model 122.

Figure 2:
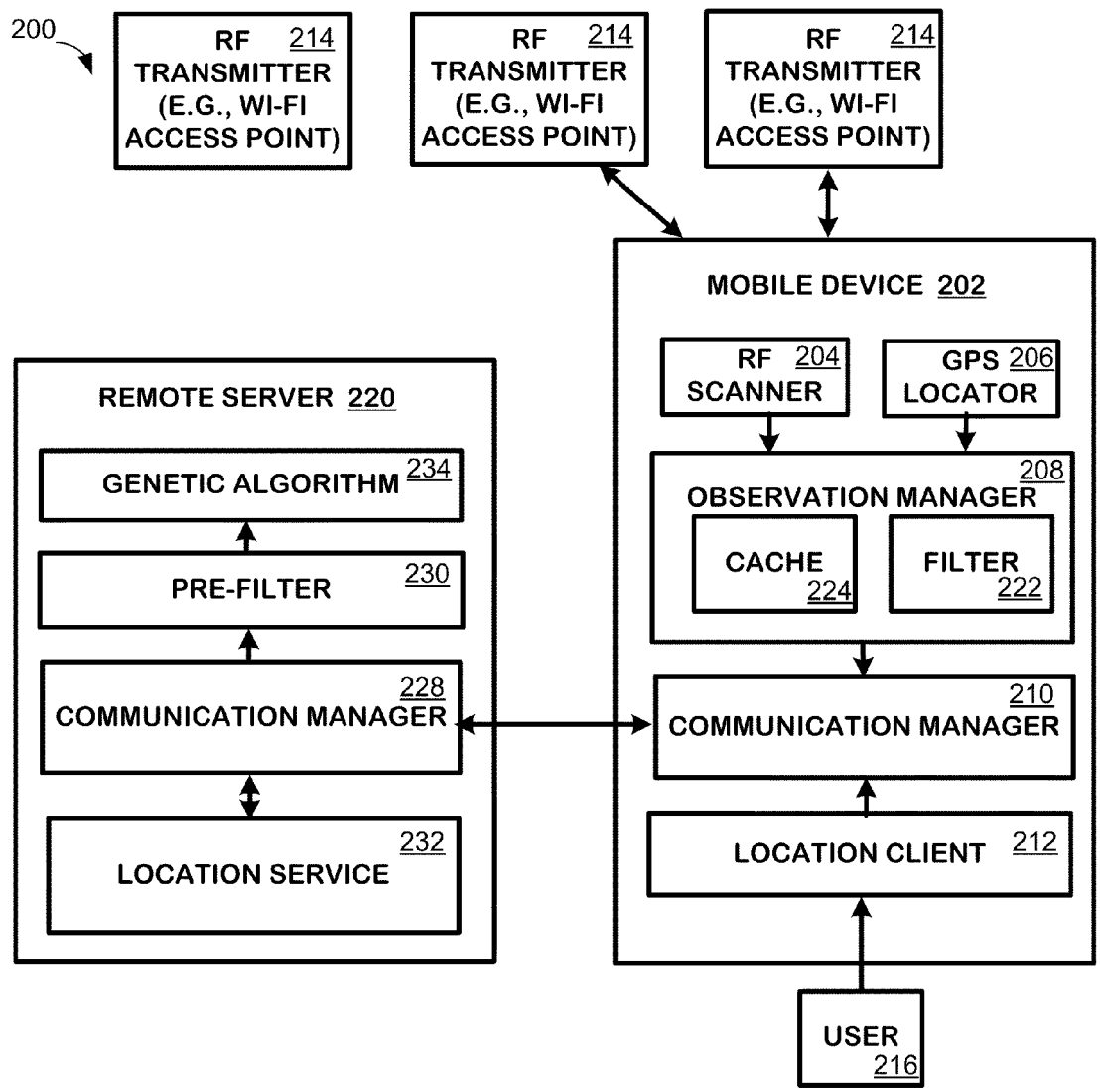
FIG. 2 is another exemplary architecture for employing another exemplary embodiment of the simultaneous localization and RF modeling technique.

FIG. 2 provides another exemplary architecture 200 for employing the simultaneous localization and RF modeling technique. A mobile device 202, as depicted in FIG. 2 comprises five components namely, a RF scanner 204, a GPS locator 206, an observation manager 208, a communication manager 210 and a location client 212. The RF scanner 204 periodically scans for wireless access points 214. In one working embodiment, the RF scanner 204 scans for about 3 seconds collecting roughly 30 beacons from each AP 214. Collecting multiple beacons allows for computing average RSS values and reduces the errors due to multi-path effects. Computation of the standard deviation can be used to determine the quality of the data. For example, a mobile user 216 in motion will see higher standard deviations in the RSS compared to a stationary observer. The GPS locator 206 is triggered periodically along with the RF scanner 204. It uses the device's internal GPS information to obtain the latitude and longitude of the mobile device 202. The GPS locator 206 is used to transmit known locations opportunistically whenever the user 216 is located near balconies, entrances or doors and obtains a GPS lock.

The communication manager 210 handles all communication between the client and the server. In one working embodiment, the technique uses a Wi-Fi interface to communicate.

The observation manager 208 collects raw data from the RF scanner 204 and filters it in a filter 222 before transmitting it to the server 220. The observation manager 208 computes the average and standard deviation of the RSS over all the readings for each AP. In one working embodiment, average RSS readings less than −85 dB are deemed unreliable and dropped. Low RSS readings can lead to large location accuracies due to decreased spatial resolution arising out the exponential nature of signal decay. The observation manager 208 also suppresses transmission of RSS readings with a high standard deviation. Transmitting data from the same location over and over again when the mobile user is stationary can be wasteful. To avoid this, in one embodiment of the technique, the observation manager 208 maintains a cache 224 of recently transmitted values and suppresses potentially duplicate information by checking against the cache.

The location client 212 provides an interface to send queries to the server 220 issued from the user 216. Upon receiving a query request from the user 216, the location client 212 first attempts to use the GPS locator 206 to obtain its location. Upon failing, it uses the RF Scanner 204 to obtain the list of APs 214 seen and the corresponding RSS values. These values are sent in the query to the server 220 using the communication manager 210 on the mobile device 202.

The server 220, as depicted in FIG. 2 comprises four components namely, a communication manager 228, a pre-filter 230, a location service 232, and a genetic algorithm (GA) module 234. The location service 232 is responsible for handling location queries from various users. Upon receiving a query (comprising RSS values seen from various APs 214) it forwards the request to a GA module 234. The GA module 234 then uses the current estimate of the AP parameters to convert the RSS values into distances. Location is then estimated in the location service module 232 using trilateration and sent back to location client 212 using the communication manager 228. Trilateration is a method of determining the relative positions of objects using the geometry of triangles in a similar fashion as triangulation. Unlike triangulation, which uses angle measurements (together with at least one known distance) to calculate the subject's location, trilateration uses the known locations of two or more reference points, and the measured distance between the subject and each reference point.

In one embodiment, the pre-filter 230 is responsible for analyzing the received RSS data received periodically from various users and presenting only a representative subset to the GA module 234. This is important to make the technique practical, since solving the equations with thousands of locations may require impractically long amounts of time. In one embodiment, the pre-filter 230 uses specialized algorithms described later in Sections 2.1 and 2.2 to reduce the volumes of data to a manageable set of equations.

The GA module 234 continuously runs a GA (described later in more detail) to solve the equations, improving the estimates of the AP parameters in each generation. The GA is inherently amenable to massively parallel computation, since each of the operations such as crossover and mutation, for example, can be parallelized.

1.3 Exemplary Processes Employed by the Simultaneous Localization and RF Modeling Technique.

The following paragraphs provide descriptions of exemplary processes for employing the simultaneous localization and RF modeling technique. It should be understood that in some cases the order of actions can be interchanged, and in some cases some of the actions may even be omitted.

Figure 3:
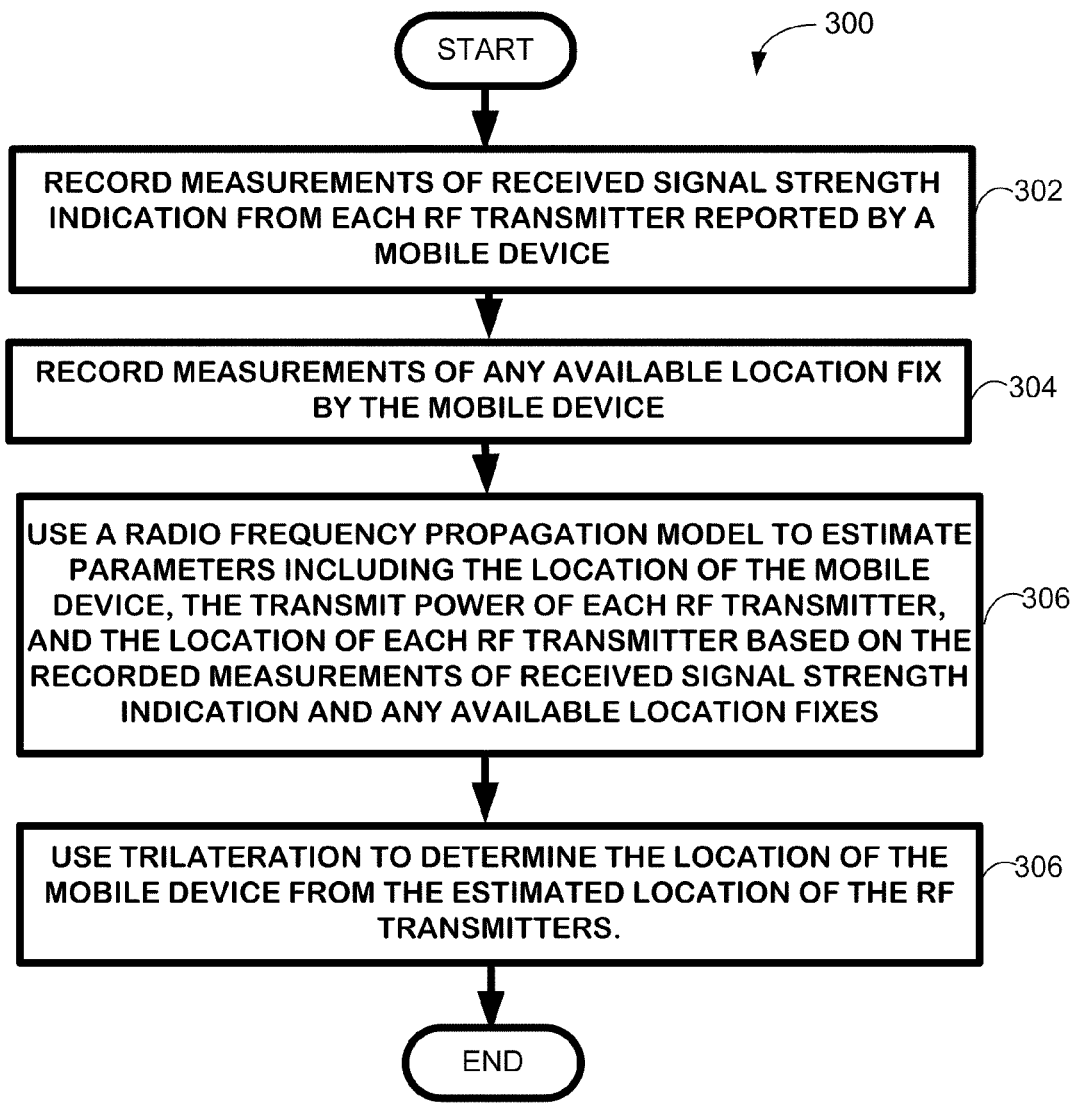
FIG. 3 depicts a flow diagram of an exemplary process for employing one embodiment of the simultaneous localization and RF modeling technique.

FIG. 3 depicts an exemplary computer-implemented process 300 for performing localization of one or more mobile devices. As shown in block 302, measurements of received signal strength indication (RSSI) are recorded from each Radio Frequency (RF) transmitter reported by a mobile device. Additionally, as shown in block 304, measurements of any available location fix by the mobile device are also recorded. As shown in block 306, a RF propagation model is used to estimate parameters that include the location of the mobile device, the transmit power of each RF transmitter, and the location of each RF transmitter based on the recorded measurements of received signal strength indication and any available location fixes. Trilateration is then used, as shown in block 308, to determine the location of the mobile device from the estimated location of the RF transmitter and the estimated parameters.

Figure 4:
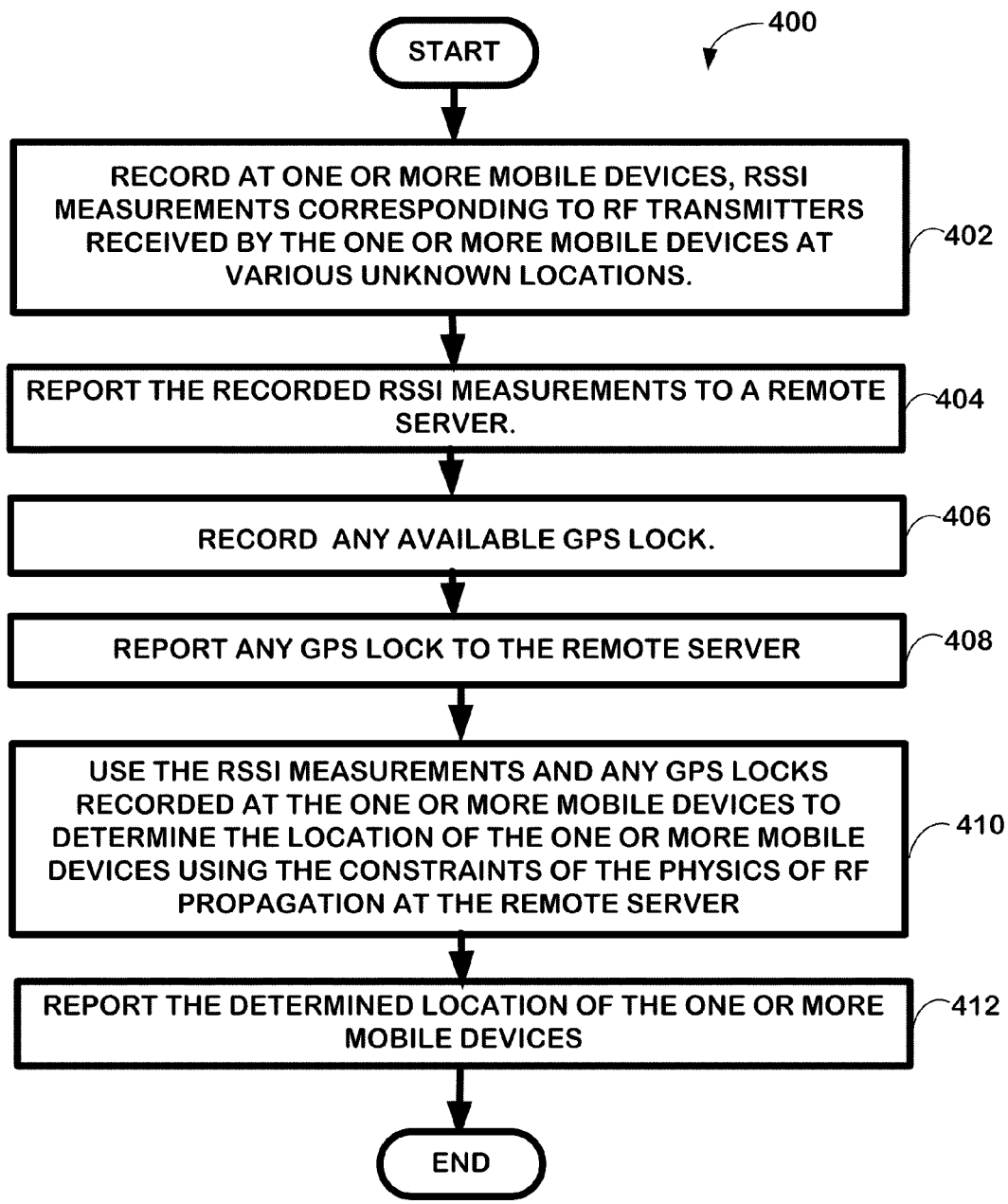
FIG. 4 depicts a flow diagram of another exemplary process for employing another embodiment of the simultaneous localization and RF modeling technique.

FIG. 4 depicts another exemplary computer-implemented process 400 for determining the location of one or more mobile devices in a space. As shown in block 402, RSSI measurements corresponding to RF transmitters received by the one or more mobile devices at various unknown locations are recorded at one or more mobile devices. The recorded RSSI measurements are sent to a remote server, as shown in block 404. Any available GPS lock is also recorded at the one or more mobile devices, as shown in block 406. The recorded GPS locks are also reported to the remote server, as shown in block 408. As shown in block 410, the RSSI measurements and any GPS locks recorded at the one or more mobile devices are used to determine the location of the one or more mobile devices using the constraints of the physics of RF propagation at the remote server. The determined location of the one or more mobile devices is reported back to one or more of the mobile devices, as shown in block 412.

1.4 Creation and Use of a RF Model.

An overview of the technique and related art, as well as exemplary architectures and processes employing the technique, having been discussed, the following sections provide exemplary computations used in one embodiment of the technique to create and use a RF model (e.g., as shown in FIG. 1, block 122) to determine mobile device location. In general, the model is created using a set of LDPL equations and then these equations are used to find the location of one or more mobile devices. In one embodiment a genetic algorithm in used to solve the set of equations.

Figure 5:
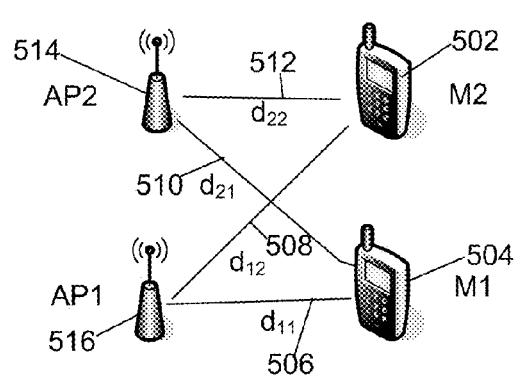
FIG. 5 depicts a diagram showing how knowing enough distances between access points and mobile devices allows a unique determination of their relative locations.
Figure 5:
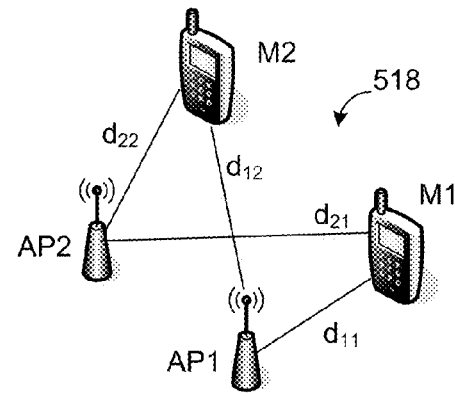
Figure 5:
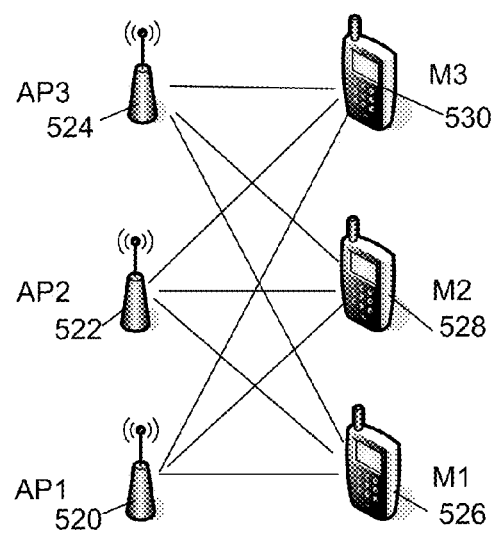

1.4.1 Localization using the Simultaneous Localization and RF Modeling Technique To provide a physical intuition to the working of the simultaneous localization and RF modeling technique described herein, example scenarios depicted in FIG. 5 are referred to. In scenario 1-A, two mobile nodes (M1 502 and M2 504) have measured their distances ($d_{11}, d_{12}, d_{21}, d_{22}$) 506, 508, 510 and 512, respectively, from two APs (AP1 516 and AP2 514) with the hope of determining their locations relative to the two APs. This is, however, not possible, since the same set of distances allows for several different possibilities for relative locations (an alternative scenario 518 is depicted in Scenario I-B). For a set of three APs 520, 522, 524 and three mobile user locations 526, 528, 530 (as depicted in Scenario-II), it can be shown that knowing all nine pairs of distances between APs and mobile users allows for only one possible realization for their relative positions. Such a structure is deemed localizable, (or globally rigid) i.e., the entire set of locations can be translated, rotated and reflected (flipped) but not distorted in any manner if all distances are to be preserved. Localizability is a well studied area and conditions for localizability have been well studied. In general given "enough" distance constraints between APs and mobile devices, it is possible to establish all their locations in a relative sense. Knowing the absolute locations of any three non-collinear mobile devices then allows determination of the absolute locations of the rest.

In practice, however, the distances between mobile devices and APs can only be inferred from RSS values.

$$p_{ij}=P_i-10\gamma_i \log d_{ij}+R \quad (1)$$

In Eqn 1, the $j^{th}$ mobile user located at a distance $d_{ij}$ (e.g., measured in meters) from the $i^{th}$ AP sees a signal strength of $p_{ij}$ (measured in dBm). $P_i$ is the RSS from the $i^{th}$ AP at a distance of one meter (referred to as transmit power henceforth). The path loss exponent $\gamma_i$ captures the rate of fall of RSS in the vicinity of the $i^{th}$ AP. The higher the value of $\gamma_i$, the steeper is the fall of RSS with distance. The need for having a different $\gamma_i$ for each AP arises from the fact that rate at which RSS falls with distance depends on the local environment. RSS from an AP that is located in an area surrounded by walls, people and other obstacles might decay at a much faster rate compared to the same from other APs in the indoor environment that enjoy relatively freer signal propagation. R in Eqn 1 is a random variable that hopes to capture the variations in the RSS due to multi-path effects, asymmetries in the physical environment (e.g., obstructions) and other imperfections in the model itself.

Based on a log distance path loss (LDPL) model $d_{ij}$ can be computed as, $$d_{ij} = 10^{\left(\frac{P_i-p_{ij}}{10\gamma_i}\right)}. \quad (2)$$

Eqn 2 assumes the a priori knowledge of $P_i$ and $\gamma_i$. The simultaneous localization and RF modeling technique, takes a novel approach to estimating these. Given a set of RSS observations between APs and mobile users ($p_{ij}$), the technique treats $P_i$ and $\gamma_i$ as unknowns in addition to the unknown locations of APs and mobile users. It then solves the set of simultaneous equations formed by the LDPL model for each RSS observation.

Assume that there are m APs and n unknown locations on a floor. For simplicity assume that all the m APs are visible from each of the n locations (this assumption will be relaxed later in this section). The total number of RSS observations and hence the total number of LDPL equations will be mn. Assuming 2D locations, each of the n locations has two unknowns namely the x and y coordinates. Each of the m APs has four unknowns namely $P_i$, $\gamma_i$ and its 2D location. The total number of unknowns is thus 4m+2n.

While mn grows in a quadratic fashion, 4m+2n grows linearly. This suggests that given enough locations (such that mn>4m+2n), there will be eventually enough constraints in the system of equations to make the system uniquely solvable. Closer examination however, reveals that the system of LDPL equations is scale, translation, rotation and reflection invariant. In other words, a solution to LDPL equations will yield locations that are a scaled, translated, rotated and/or reflected version of the true locations. Knowing three true, non-collinear locations (either AP or mobile users) then, all the other true locations can be determined.

1.4.2 The Nature of LDPL Equations

LDPL equations (Eqn 1) are a system of simultaneous non-linear equations. This section explains the nature of solutions to LDPL equations.

1.4.2.1 Solving for the Parameters of a Solitary AP

It is well known that distances from at least three known non-collinear locations are necessary to uniquely determine an unknown location (using trilateration). A corresponding issue in the simultaneous localization and RF modeling technique is, what is the minimum number of known locations at which RSS measurements must be taken in order to uniquely determine the four AP parameters namely P,γ and the 2D location?

If P and γ are known, then a RSS measurement p can be converted into the distance d between the x and the AP using the equation Eqn 2. A minimum of three such RSS measurements at known locations are then required to uniquely establish the location of the AP. In the absence of the knowledge of P and γ, then, two additional measurements (constraints) will be required to uniquely determine their values. In other words five RSS measurements are required to uniquely determine an AP. It also follows that that given RSS measurements from only four known locations, there will be two possible solutions for (P, γ and location) that satisfy the set of four RSS measurements.

1.4.2.2 The Notion of Co-Circular Dependency

It is well known that three or more collinear locations cannot be used in trilateration to determine an unknown location. A similar yet slightly different situation arises in solving LDPL equations when all the locations where RSS observations were taken are co-circular with respect to the AP i.e., lie on a circle centered around the AP's location. In this special case, while the location of the AP can be ascertained as the centre of the circle passing through these locations, it is impossible to uniquely determine both P and γ. In the simultaneous localization and RF modeling technique thus, one embodiment avoids observations that have almost the same RSS values from the same AP.

1.4.3 Localizability

While a necessary criterion for the existence of a unique solution to the system of simultaneous equations is that the number of equations should greater than or equal to the number of variables, this is by no means a sufficient condition that guarantees a unique solution. For example, if there are 6 APs ($AP_1$ through $AP_6$) and 20 mobile user locations from which RSS observations were made, an edge between an AP and a mobile user location is drawn if and only if the AP can be seen from that location. The number of LDPL equations in this system is 61, and the number of variables is 58. However, from the very structure it is clear that the system is not localizable since the group of APs, AP1 through AP3 is free to rotate about to the AP4 through AP6.

The localizability question in the simultaneous localization and RF modeling technique is as follows: given a set of RSS measurements at some unknown and known locations, is it possible to determine a unique set of coordinates for all the unknown locations by solving the corresponding the simultaneous localization and RF modeling technique's equations? The question is extremely relevant because, in practice not all APs may be visible from all locations in the indoor environment. Unfortunately, determining the necessary and sufficient conditions under which a set of LDPL equations has a unique solution is still an open problem.

However, for most practical scenarios, it is possible to determine whether or not a system of LDPL equations can be uniquely solved by making sure that following three conditions are satisfied.

C1: Each unknown location must see at least 3 APs.

C2: Each AP must be seen from at least 5 locations (known or unknown)

C3: The Jacobian of the system of LDPL equations must have a full rank (equal to the number of variables) for a random choice of the AP parameters and unknown locations.

Conditions C1 and C2 follow from the discussion in Section 1.5.2.1 and 1.5.2.2. Condition C3 essentially linearizes the system of LDPL equations into the form Jy=k, where J is the Jacobian, y is a vector containing all unknown parameters and k a constant vector. The lack of full rank then exposes any insufficient coupling in the equations.

1.5 Computational Challenges

While there are several different approaches to solving a set of over-determined equations, in one implementation, the technique attempts to find a solution that minimizes the least mean absolute error, $$J_{EZ} = \frac{1}{N} \sum_{ij} |P_{ij} - P_i^0 + 10 * \gamma_i \log d_{ij}| \quad (3)$$

In Eqn 3, N is the total number of equations.

$J_{EZ}$ is a non-linear objective function and does not appear to allow for an analytical closed form solution. Optimization schemes such as the Newton Raphson Method or Gradient Descent (GD) are iterative schemes that start from an initial guess and find the closest local minimum. It was found that such schemes fail to find a solution to $J_{Ez}$ since the number of local minima in $J_{EZ}$ is immense. The other alternatives are search techniques such as simulated annealing or genetic algorithms. While genetic algorithms can search the solution space efficiently, they can miss local minima that might provide a reasonably good solution. Consequently, to obtain the benefits of both these approaches, in one implementation of the technique, a hybrid approach is used that used gradient descent to refine the solutions generated by a GA.

Solving LDPL equations using the GA can take a few minutes to several hours depending on the size of the problem. However, these equations need only be solved once (or periodically once every a few days to refresh the model) to determine the AP locations, their transmit powers and the path loss exponents. Once having estimated the model, new location queries can be answered through standard techniques such as trilateration (by converting RSS measurements to distances in Eqn 2) in real-time. It should be noted that although various embodiments of the simultaneous localization and RF modeling technique described herein employ a LDPL model, other derivatives of the LDPL model could be employed with the technique with other parameters that might also be estimated.

1.5.1 The Genetic Algorithm (GA)

The Genetic Algorithm (GA) employed in one embodiment of the technique starts by picking an initial set of solutions (initial generation) randomly and refining them using gradient descent. A solution consists of a vector of values of all the unknowns to be solved in the LDPL equations. The fitness of each solution is then evaluated by computing $$\frac{1}{J_{EZ}}$$

for the solution. Thereafter, consecutive generations of solutions are generated in the following manner:

1. 10% of the solutions with the highest fitness are retained.

2. 10% of the solutions are randomly generated.

3. 60% of the solutions are generated by picking two solutions $S_1^{old}$, $S_2^{old}$ from the previous generation (parent solutions) and mixing them using a random convex linear combination. In other words, $$S^{new} = a \cdot S_1^{old} + (1-a) \cdot S_2^{old} \quad (4)$$

Here, a is a random vector with each element independently randomly drawn from (0,1), 1 is vector with all its elements equal to 1 and ■ represents a vector dot product. The newly generated solution is then refined using a Gradient Descent (GD) technique.

4. The remaining 20% solutions are generated by randomly picking a solution from the previous generation and perturbing it (e.g., using perturbation based mutation) by adding (or subtracting) random values (drawn from an exponential distribution to allow occasional large perturbations) to all the locations, $P_i$ and $\gamma_i$. The solutions are then refined using the GD.

As generations evolve, solutions with higher fitness are discovered. The process terminates the GA when no improvement is found for ten consecutive generations.

1.5.2 Reducing the Search Space

When the solution space is extremely large, a randomly picked solution is likely to be far from the optimal solution. Consequently it may take a large amount of time before the GA discovers the optimal solution. Narrowing the search space can dramatically reduce running times. The most obvious way to narrow search space is to limit the search space of the variables. For example, knowing the dimensions of the floor one can limit the search of the locations to within the floor perimeter. For AP transmission powers the technique chooses a generous search space namely (−50,0)dBm. For $\gamma_i$ the technique chooses the search space (1.5,6.0). It is believed that these ranges will be accommodating for most practical indoor deployments.

Another way to narrow the search space is to leverage constraints inherent to the problem. Given m APs and n locations, as previously discussed there are a total of 4m+2n variables to be picked randomly. However, having picked all the 4m AP parameters the 2n unknown locations can be determined through trilateration (using Eqn 2 to convert RSS to distances). Thus, the GA needs to randomly pick only 4m unknowns rather than 4m+2n. Eliminating each variable to be picked randomly exponentially reduces the search space.

The search space can be further reduced by using the already determined (or known) locations. For example, suppose that a particular AP can be seen from three known locations. Then after randomly picking P and y, its location can be uniquely determined. In general, the underlying constraints in the LDPL equations can be listed as follows:

R1: If an AP can be seen from five or more fixed (or determined) locations, then all four of its parameters can be uniquely solved.

R2: If an AP can be seen from four fixed locations, there exist only two possible solutions for the four parameters of the AP.

R3: If an AP (say $i^{th}$ AP) can be seen from three fixed locations. Then after picking $\gamma_i$ randomly from (1.5,6.0) there exist only two possible solutions that satisfy the observations for the AP location and its transmission power.

R4: If an AP can be seen from two fixed locations, then, having picked $P_i$ and $\gamma_i$ randomly, there will be only two possible locations for its location.

R5: If an AP can be seen from one location only, then, after picking $P_i$ and $\gamma_i$ randomly, the AP can only lie on a circle of radius given by Eqn 2 centered about the known location.

R6: If the parameters for three (or more) APs have been fixed, then all unknown locations that see all these APs can be exactly determined using trilateration.

Constraints R0-R6 indicate that after selecting only a few of the variables randomly, the rest can be deterministically computed. The smaller the number of randomly chosen variables, the smaller is the search space.

Based on these underlying constraints in EPL equations, a Random Solution Generation Algorithm (RSGA) was developed. RSGA attempts to minimize the number of variables that need to be randomly picked among the entire set of variables in a given set of equations in a greedy fashion. The essential idea behind RSGA is to start by determining AP parameters with as many known locations as possible. Upon determining AP parameters for three or more APs, locations that can see these APs can be determined using trilateration. These determined locations in turn can be used to determine the parameters of some other APs. The procedure continues until all APs and locations have been determined. The pseudo code for RSGA is provided below:

Function RSGA($L_{done}$, $C_{done}$, O, l, base)
repeat
  change=false
  for i=1 to mdo
    if i∈Cthen
      set O'=$p_{ij}$|j∉$L_{done}$
    if |O'|≧l then
      {$c_i$, $P_i$, $\gamma_i$}=APRandomInit(l,O',$L_{done}$)
      $C_{done}$=$C_{done}$∪{i}
      change=true
      if l<base then
        return true
      end if
    end if
  end if
end for
if change=false then
  if l>0 then
    change=RSGA($L_{done}$, $C_{done}$, O, l−1, base)
    if l<base then
      Return change
    end if
  else
    Return change
  end if
end if
for j=1 to ndo
  if j∉L then
    set O'=$p_{ij}$|i∈$C_{done}$
    if |O'|≧3 then
      $x_j$=Trilaterate(O',C)
      $L_{done}$=$L_{done}$∪{j}
      change=true
    end if
  end if
end for
until change=true
Return change RSGA is a recursive algorithm that takes five inputs. $L_{done}$ is the set indices of all locations where RSS observations were taken that have been determined so far. $C_{done}$ is the set of indices of APs with their AP parameters determined. O is the set of RSS observations $p_{1\ldots n, 1\ldots m}$. l is the recursion level which searches for the constraint Ri. base takes a value of 5 if there are 5 or more known locations, otherwise it takes the value of the number of known locations. The entire procedure begins by initializing $L_{done}$ with indices of all the known locations, $C_{done}$ as an empty set and l=base. The function APRandomInit(l,O',$L_{done}$) finds a set of random AP parameters given l determined (or known) locations based on constraint rule Ri. For each value of l in APRandomInit(l,O', $L_{done}$) a different strategy is used to determine the random AP parameters based on constraints R2-R6. For example, in case of R2 or R3 (l=4,5), the value of the AP parameters is determined through an exhaustive search over several combinations of P and γ in combination with trilateration. In case of R4 (l=3), γ is chosen randomly and P is searched exhaustively to determine local minima in the mean absolute error. At l=0, all AP parameters are generated randomly.

2.0 Challenges in Real Environments

In this section the novel practical challenges addressed by one embodiment of the technique are addressed.

2.1 Selecting the Right Set of Access Points

In one working embodiment of the simultaneous localization and RF modeling technique, the sheer number of wireless APs that could be seen on a given floor in test deployments came as a rather unexpected surprise. For example, in one deployment one could see a total of about 160 APs across a single office floor. A large fraction of these APs actually belonged to neighboring office buildings. Another interesting observation was that often each AP was configured with multiple Service Set Identifiers (SSIDs) and appeared as different APs. Running the technique on all observed APs would constitute a computational hardship at the cost of incremental gains. Consequently, an automated AP filtering mechanism is employed by one embodiment of the technique that analyzes the data and selects the most suitable APs. Note that the technique has no information as to if these APs belonged to the indoor environment in question or not.

Several naive approaches to AP selection can be designed based on desirable properties such as coverage, low standard deviation in RSS, and high average signal strength. For one embodiment of the technique however, the goal was to minimize the number of selected APs while preserving performance. To this end, a access point selection algorithm, herein called APSelect, was developed. The essential idea behind APSelect is to select each AP to provide information that other selected AP do not. APSelect however, uses a more approximate and simpler approach. It starts by computing a similarity metric for each pair of APs based on observed RSS. APs with the most similar data are then clustered together. A representative AP is then elected from each cluster.

To compute the similarity metric, all the RSS observations $p_{ij}$ from the $i^{th}$ AP at the jth location are first normalized to lie within the range (0,1) by dividing them by 100 (since observed RSS typically lie in the range 0 to −100 dBm) and then their mean is subtracted from each reading to give a normalized RSS observation $p_{ij}^{normalized}$. When RSS readings are not available at certain locations, these gaps are filled with a reading of −100 dBm assuming that the RSS is below the receive threshold of the receiver. The similarity metric is then computed as, $$\lambda_{ij} = 1 - \frac{1}{n}\sum_k |\hat{p}_{ik} - \hat{p}_{jk}| \quad (5)$$

$\lambda_{ij}$ essentially measures how similar RSS readings were across all locations (known and unknown) for the two APs.

For clustering similar APs, hierarchical clustering is used. Initially each AP represents a single cluster and at each following step two of the most similar clusters are merged. The similarity between two AP clusters is computed as the average similarity between all inter-cluster pairs of APs. For selecting a representative AP within a cluster all APs are first ranked in the order of the number of known locations that can be see the AP. An AP that can see a larger number of known locations is given a higher priority. Among APs with same priority, an AP which has the highest average similarity to rest of the APs in its cluster is selected as the cluster head. In one embodiment the minimum number clusters is selected while ensuring that no two clusters have a similarity greater than 90%.

2.2 Selecting a Subset of Locations

For creating the RF model, ideally RSS observations come from several different locations across the indoor environment. For example, data from a single mobile user who actively ventures to different places across the indoor space to different locations while his mobile device transmits the RSS information to a server. Alternatively, data can come from a large number of mobile device users spread out across various locations of the indoor space. Given the large amount of data, then, the technique culls out the "useful" subset of data.

To tackle this problem a location selection algorithm, herein called LocSelect, was developed. LocSelect works in a similar manner as APSelect, except that each new location is selected such that the RSS information it provides has minimum overlap with other selected locations.

2.3 Receiver Gain Differences

While ideally all mobile devices should measure the same RSS, they often do not. The average RSS received by different mobile devices at the same location, during the same time interval and oriented along the same direction at line-of-sight from an AP can have large differences. Such differences can arise from the difference in receiver gains of these mobile devices and calibration errors. Since several different mobile devices can participate in the simultaneous localization and RF modeling technique, such differences can potentially increase localization errors. It has been suggested to maintain a database of pre-measured differences in receiver gains among various well known mobile devices. However, it has been found that there are gain differences of 2-7 dB even among two devices of the same model.

To account for these gain differences an additional unknown parameter—the receiver gain G, for each user, is introduced in one embodiment of the technique. In other words the LDPL model becomes, $$p_{ij}^k = P_i - G^k + 10 * \gamma_i \log d_{ij}^k + R \quad (6)$$

Here, the superscript k indicates data specific to the $k^{th}$ mobile device and $G^k$ is the receiver gain of the mobile device. $G^k$ can then be estimated using the genetic algorithm along with all the other parameters.

In one implementation of the technique a novel approach is taken to estimate $G^k$. The basic idea is that if two users happen to transmit RSS observations from the same (or nearby) locations, then, the difference in gains between the two users can be estimated by subtracting their observations. In practice, however, the technique does not know the locations from which the RSS data was obtained (unless a corresponding GPS reading was obtained). Hence, the technique must rely on the RSS observations to ascertain that the observations from the two users were indeed taken from the same or close locations. To this end, the technique uses the fact that proximity between two locations can be inferred from the likeliness of the RSS readings seen at these locations. Suppose the RSS readings seen by two users are $<p_1^1, p_2^1, \ldots p_m^1>$ and $<p_1^2, \ldots p_2^2-p_m^2>$ respectively, then the affect of the receiver gains can then be eliminated by computing the vectors $<p_2^1-p_1^1, \ldots p_m^1-p_1^1>$ and $<p_2^2-p_1^2, \ldots p_m^2-p_1^2>$. The technique uses the distance between these vectors to infer the likelihood that these readings came from locations that were close by. By creating pairs of readings from the two users' RSS data, that are most likely to have come from the same location, the technique estimates the difference in gains from between the users' receivers. These estimates can then be used as constraints in the genetic algorithm.

When a new mobile user enters the indoor space, the trilateration based localization (after using AP parameters to convert RSS to distances from the APs) can lead to errors if the receiver gains are not taken into account.

3.0 The Computing Environment

The simultaneous localization and RF modeling technique is designed to operate in a computing environment. The following description is intended to provide a brief, general description of a suitable computing environment in which the simultaneous localization and RF modeling technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 6:
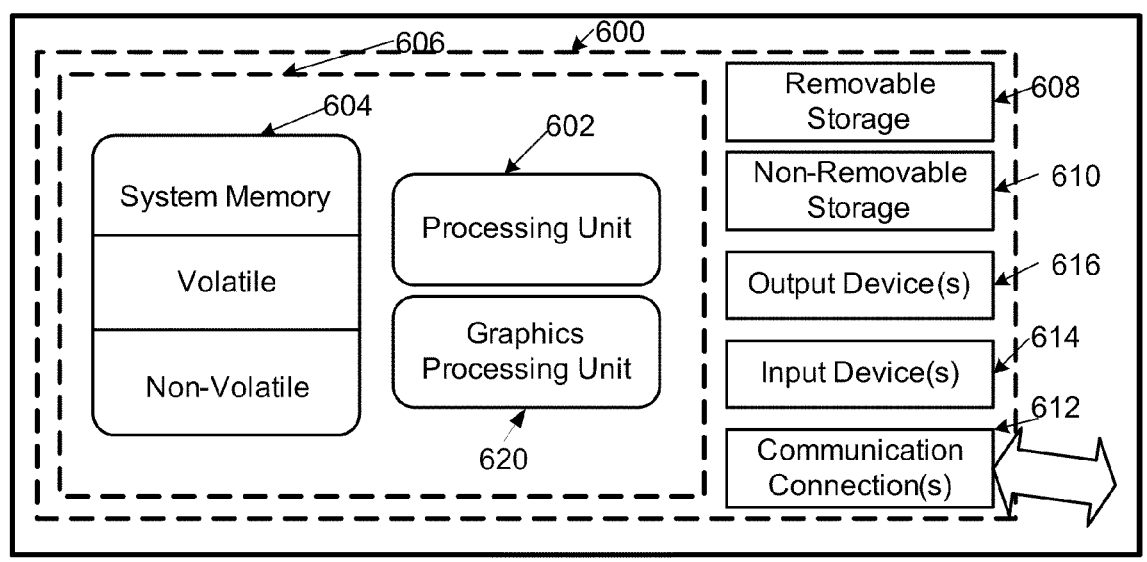
FIG. 6 is a schematic of an exemplary computing environment which can be used to practice the simultaneous localization and RF modeling technique.

FIG. 6 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 6, an exemplary system for implementing the simultaneous localization and RF modeling technique includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, device 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can accessed by device 600. Computer readable media include both transitory, propagating signals and computer (readable) storage media. Any such computer storage media may be part of device 600.

Device 600 also can contain communications connection(s) 612 that allow the device to communicate with other devices and networks. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 600 may have various input device(s) 614 such as a display, keyboard, mouse, pen, camera, touch input device, and so on. Output device(s) 616 devices such as a display, speakers, a printer, and so on may also be included. All of these devices are well known in the art and need not be discussed at length here.

The simultaneous localization and RF modeling technique may be described in the general context of computer-executable instructions, such as program modules, being executed by a computing device. Generally, program modules include routines, programs, objects, components, data structures, and so on, that perform particular tasks or implement particular abstract data types. The simultaneous localization and RF modeling technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for performing localization of one or more mobile devices, comprising:
   using a computing device for:
      recording measurements of received signal strength indication (RSSI) from each Radio Frequency (RF) transmitter reported by a mobile device;
      recording measurements of any available location fix by the mobile device;
      using a RF propagation model, prepared without prior knowledge of the physical space in which the mobile device is located or the location and power of the RF transmitters, to estimate parameters comprising: the location of the mobile device, the transmit power of each RF transmitter, and the location of each RF transmitter based on the recorded measurements of received signal strength indication and any available location fixes; and
      using trilateration to determine the location of the mobile device from the estimated location of the RF transmitters and the estimated parameters.

2. The computer-implemented process of claim 1, wherein determining the location of the mobile device further comprises:
   translating the RSSI measurements reported by the mobile device into distances from the corresponding RF transmitters whose locations are estimated with the RF propagation model, and
   using the distances from at least three RF transmitters to compute the location of the mobile device.

3. The computer-implemented process of claim 1 further comprising creating the RF propagation model using a log distance path loss model.

4. The computer-implemented process of claim 1, further comprising using a combination of a gradient descent approach and a genetic algorithm to estimate the parameters using the RF propogation model.

5. The computer-implemented process of claim 1 wherein the location of any available location fix is obtained by a global positioning system device.

6. A computer-implemented process for performing localization, comprising:
   using a computing device for,
      recording at one or more mobile devices, RSSI measurements corresponding to RF transmitters received by the one or more mobile devices at various unknown locations;
      reporting the recorded RSSI measurements to a remote server;
      recording any available GPS lock at the one or more mobile devices;
      reporting any GPS lock to the remote server;
      using the RSSI measurements and any GPS locks recorded at the one or more mobile devices to determine the location of the one or more mobile devices, without prior knowledge of the physical space in which the mobile devices are located or the location and power of the RF transmitters, using the constraints of the physics of RF propagation at the remote server; and
      reporting the determined location of the one or more mobile devices.

7. The computer-implemented process of claim 6 wherein the RF transmitters are located in an indoor environment.

8. The computer-implemented process of claim 6 wherein the RF transmitters are located in an outdoor environment.

9. The computer-implemented process of claim 6 wherein only one mobile device traversing the environment over time is used to obtain the location of the mobile device.

10. The computer-implemented process of claim 6, wherein the constraints are modeled using a log distance path loss model.

11. The computer-implemented process of claim 10 wherein the constraints modeled using the log distance path loss model are solved using a genetic algorithm.

12. The computer-implemented process of claim 9, wherein the constraints further comprise:
- location of each RF transmitter;
- transmit power of each RF transmitter; and
- a decay constant of the log distance path loss model.

13. A system for determining locations of a Wi-Fi capable device in an indoor environment, comprising:
- a general purpose computing device;
- a computer program comprising program modules executable by the general purpose computing device, wherein the computing device is directed by the program modules of the computer program to,
- periodically scan for Wi-Fi access points using a Wi-Fi enabled mobile device;
- transmit a list of discovered Wi-Fi access-points and associated received signal strength indication (RSSI) measured by the mobile device to a remotely located server;
- transmit any GPS locations discovered by the mobile device to the remotely located server;
- use a RF model of the indoor environment, created without prior knowledge of the space the mobile device is located in or the location and power of the Wi-Fi access points, using the list of discovered Wi-Fi access points and associated received RSSI and the discovered GPS locations to provide the location of the mobile device to user of the mobile device.

14. The system of claim 13 wherein the location of the mobile device is provided to the user without action by the user.

15. The system of claim 13 wherein the location of the mobile device is determined without any prior knowledge of the location of the mobile device, the location of the Wi-Fi access points or knowledge of the RF power of the Wi-Fi access points.

16. The system of claim 13 wherein the RSSI values are used to determine relative distances between Wi-Fi access points and wherein the relative locations between the Wi-Fi access points are used to determine the location of the mobile devices.

17. The system of claim 13 wherein determined locations of the Wi-Fi access points are used to find unknown locations of the Wi-Fi access points.

18. The system of claim 17 wherein only a subset of the determined locations are selected for use to find the unknown locations, wherein the subset of the selected locations are selected by removing redundant determined locations.

19. The system of claim 13 further comprising a module for using a subset of the list of discovered access points that do not provide redundant information when using the created RF model to provide the location of the mobile device to a user.

20. The system of claim 13 wherein gains of the mobile devices are estimated by using RSS readings of pairs of mobile devices that are most likely at the same location.

* * * * *